United States Patent
Stachura et al.

(10) Patent No.: US 6,629,248 B1
(45) Date of Patent: Sep. 30, 2003

(54) APPARATUS AND METHOD FOR MAINTAINING A SECURITY ASSOCIATION FOR MANAGEABILITY ACROSS POWER FAILURES

(75) Inventors: Thomas L. Stachura, Portland, OR (US); Anil Vasudevan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,730

(22) Filed: Mar. 30, 2000

(51) Int. Cl.[7] ............................................. G06F 1/30
(52) U.S. Cl. ....................................... 713/340; 714/22
(58) Field of Search ................................ 713/300, 340, 713/200; 714/15, 22; 327/365; 326/8, 104; 711/102, 103

(56) References Cited

U.S. PATENT DOCUMENTS

| | | | | |
|---|---|---|---|---|
| 4,180,856 A | * | 12/1979 | Check et al. | 705/407 |
| 4,458,307 A | * | 7/1984 | McAnlis et al. | 714/22 |
| 4,706,215 A | * | 11/1987 | Kirschner et al. | 705/405 |
| 5,008,829 A | * | 4/1991 | Cox et al. | 713/300 |
| 5,075,870 A | * | 12/1991 | Kojyo et al. | 700/254 |
| 5,519,853 A | * | 5/1996 | Moran et al. | 713/400 |
| 5,799,200 A | * | 8/1998 | Brant et al. | 713/340 |
| 5,828,823 A | * | 10/1998 | Byers et al. | 714/24 |
| 6,038,669 A | * | 3/2000 | Yang | 713/300 |
| 6,249,152 B1 | * | 6/2001 | Tanaka et al. | 327/34 |

FOREIGN PATENT DOCUMENTS

| | | | | | |
|---|---|---|---|---|---|
| JP | 09134238 A | * | 5/1997 | | G06F/1/28 |
| JP | 11134007 A | * | 5/1999 | | G05B/19/05 |

* cited by examiner

Primary Examiner—Thomas Lee
Assistant Examiner—Thuan Du
(74) Attorney, Agent, or Firm—Blakely, Sokoloff, Taylor & Zafman LLP

(57) ABSTRACT

A network includes a host personal computer (PC) that can securely communicate with other PCs connected to the network based on the use of security association information. A power-loss detection circuit receives an input signal indicative of a voltage supply level to the network and outputs an output signal indicative of a change in the voltage supply level. The security association information is stored in a storage device if the output signal from the detection circuit indicates that a change in the voltage supply level, such as a power failure or change in power states, has occurred. The security information or other information can be stored in the storage device while the voltage supply level is falling.

16 Claims, 2 Drawing Sheets

APPARATUS AND METHOD FOR MAINTAINING A SECURITY ASSOCIATION FOR MANAGEABILITY ACROSS POWER FAILURES

BACKGROUND OF THE INVENTION

1. Field of the Invention

The present invention relates to computers or networks, and in particular, relates to maintaining information, such as security association information, in the event of a power loss.

2. Background Information

Computers or networks routinely and regularly "back up" a copy of files or data in nonvolatile storage media during the course of normal operation. Such protective measures are intended to save the copy of the data in a safe location, such that if a power failure occurs that damages or causes loss of the original data, the backup copy exists and can be retrieved to replace the damaged/lost original data.

However, existing methods of regularly making backup copies suffer from a number of disadvantages. First, data is often written to storage devices in its entirety. That is, for example, all of the data in a server may be backed up. This results in inefficient use of backup storage space and additional time to perform the back up process, particularly if there are types of data that do not require a backup copy.

Next, because power failures are unpredictable, data is generally backed up according to an established frequent schedule or routine, if at all. Again, this results in inefficiency because the frequency of power failures is many times less in order of magnitude than the number of times that backup processes are performed. In other words, thousands of backup processes may be performed in order to protect data against a single power failure that occurs infrequently. Performing these large numbers of write operations into a storage device can severely limit the longevity of the storage device by using up available storage space and by successively decreasing the number of write operations that the storage device can accommodate before it becomes unuseable/unwriteable.

Additionally, because a power failure can completely terminate power supplied to a computer or network, existing backup methods are performed while full power is available (e.g., before a power failure occurs), to ensure that sufficient power is present to complete the backup procedure. In some instances, a dedicated power supply is provided to specifically supply power to perform the backup procedures. Again, this results in inefficient use of resources.

BRIEF DESCRIPTION OF THE DRAWINGS

Non-limiting and non-exhaustive embodiments of the present invention will be described in the following figures, wherein like reference numerals refer to like parts throughout the various views unless otherwise specified.

DETAILED DESCRIPTION OF THE ILLUSTRATED EMBODIMENTS

Embodiments of an apparatus and method for maintaining information, such as security association information, in the event of a power loss are described in detail herein. In the following description, numerous specific details are provided, such as the description of various network components in FIGS. 1 and 2, to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
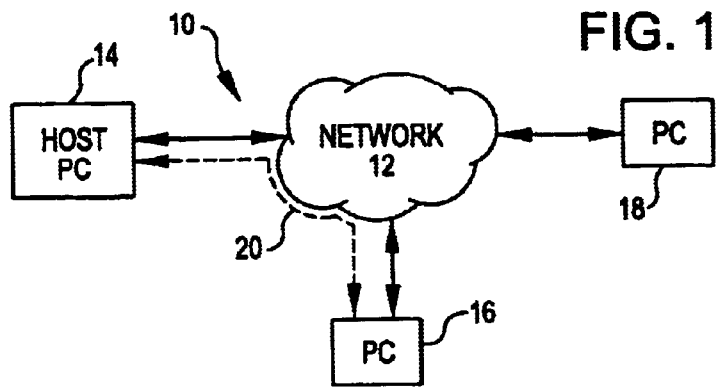
FIG. 1 is a block diagram showing an example of an operating environment for an embodiment of the present invention.

Referring first to FIG. 1, shown generally at 10 is an example of an operating environment for an embodiment of the present invention. The operating environment 10 can comprise a network 12, such as a local area network (LAN), virtual LAN (VLAN), virtual private network (VPN), the Internet, or other networks. A plurality of nodes may be connected to the network 12. These nodes can be personal computers (PCs) 14–18, servers, printers, etc.

For simplicity of explanation, the plurality of nodes will be described herein the context of PCs, and it is understood that other types of nodes may be present, such as laptops, dumb terminals, enhanced functionality wireless devices, television sets, and other types of devices that may be connectable to the network 12. Such devices may communicate with each other via the network 12 or via other communication links, and therefore can send, receive, or store different types of communication, configuration, and operating information.

In the example of the operating environment 10 shown in FIG. 1, the PC 14 may be a host PC, for example, that performs network administration functions and various system management functions. As such the host PC 14 may sometimes be referred to as a "management console." Based on this designation, the PC 16 may be referred to as a "managed client" that communicates with the host PC 14 via the network 12, shown symbolically as a communication link 20. Under a "managed" arrangement, it is possible for the host PC 14 to remotely control certain operations of the PC 16 and other nodes. For instance, the host PC 14 may be able to remotely cause the PC 16 to reboot, shut down, sleep (e.g., go into a low-power mode), etc.

Different types of information may be exchanged between the host PC 14 and the PC 16 via the link 20, or between other nodes in the operating environment 10 while in the managed arrangement. One example is security association information, which is information that provides for secure traffic between two end stations (e.g., nodes) under a standard such as Internet Protocol Security (IPSEC). According to one IPSEC method, the IPSEC software negotiates security parameters at each side (e.g., at the host PC 14 and at the PC 16), such that the PC 16 (or other managed client) has a security association for the receive path and a security association for the transmit path. After this security connection is established, subsequent traffic occurs without having to pass security association information. Instead, packets are tagged with identifying information (e.g., a security parameter index or SPI, source and destination addresses, source and destination port numbers, security protocols, etc.) which is used to identify which security association to use.

Two purposes of security association information include authentication and encryption. Authentication information provides a mechanism by which two end stations can recognize that they are sending/receiving information that is properly designated for communication between these two end stations. For instance, the host PC 14 can communicate packets of data to the PC 16 that has identifiers or tags designating the sending party and the receiving party. With encryption, packets sent between the host PC 14 and the PC 16 would be unintelligible to the PC 18. In both cases, the PC 18 (if it is a spoofing PC, for example) does not and cannot interfere with the communication between the host PC 14 and the PC 16. An effect of using or sending the security association information is that the PC 18 or other nodes cannot improperly and remotely cause the PC 16 to reboot, shut down, sleep, etc.

The operating environment 10 of FIG. 1 (as well as any of its individual components) may undergo various power cycles or power losses. These various power cycles or power states can include those defined by the Advanced Configuration and Power Interface (ACPI) standards where an operating system controls, at different levels, the amount of power provided to various peripheral devices of the PC 16. For instance, the PC 16 may be in a "secure state," where it could be either in a sleeping state or in a working state. However, a power outage may completely terminate power to key components of the operating environment 10 or a power surge may destroy data stored in machine-readable media. As a result, security association information can be lost during the outage/surge, and when power is restored, a system boot or basic input output system (BIOS) routine may fail or be unable to restore the secure connection due to the lost security association information. Under this situation, the PC 18 or other node may undesirably be able to remotely control operation of the PC 16.

Figure 2:
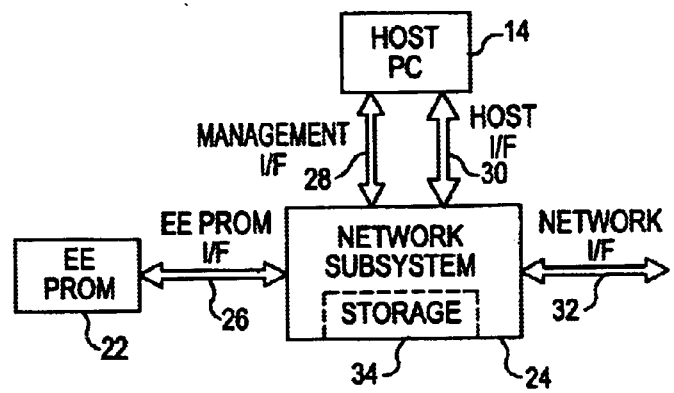
FIG. 2 is a block diagram of an embodiment of the invention that can be implemented in the operating environment of FIG. 1 and that can maintain information in the event of a power loss.

Given the importance of security association information, it is one type of information that should be maintained during power loss situations or during instances when components in the operating environment 10 go into other power cycles (e.g., low-power sleep states). An example of an apparatus and method to maintain security association information or other information during these different power states is shown schematically in FIG. 2. In FIG. 2, a storage device 22, such as an electronically erasable programmable read only memory (EEPROM), is communicatively coupled to a network subsystem 24 of the network 12 via an EEPROM interface (I/F) 26. The subsystem 24 is coupled to the host PC 14 via a management I/F 28 and a host I/F 30. The subsystem 24 can be communicatively coupled to other network components via a network I/F 32.

The subsystem 24 can comprise individual processors, controllers, terminals, servers, communication devices, cards, nodes, various other network circuit devices, including application specific integrated circuit (ASIC)-based, and silicon-based circuit implementations, etc. or any combination of these, along with associated storage devices (e.g., machine-readable media) and applicable software. In particular, the subsystem 24 may have an internal storage unit 34. The host PC 14 can load security association information into the storage unit 34, via the management I/F 28 or the host I/F 30, during normal operation.

Although FIG. 2 shows the storage device 22 as being a separate network component, it is to be appreciated that the storage device 22 can be suitably located anywhere in the operating environment 10. For example, the storage device 22 can be part of the subsystem 24, part of the host PC 14, or part of any other node in the operating environment 10. Further, the storage device 22 can be suitably coupled to any device or component in the operating environment 10 and need not be necessarily coupled to the subsystem 24 in the manner shown in FIG. 2. There may be multiple storage devices 22 located in the operating environment 10. Accordingly, embodiments of the invention are not limited by the number or specific location of the storage device 22.

According to an embodiment of the invention, shortly after an initial termination of power or during power-loss states (or changes in power cycles), security association information or other information is written (e.g., saved) in the storage device 22. In this manner, the security association information or other information is maintained during periods when such information may otherwise be damaged or lost. Hence, once normal operating power conditions are restored, the saved information may be retrieved from the storage device 22 and subsequently used to restore a secure connection.

Because a nonvolatile storage device is well suited for storing and retaining information during different power states (including power-loss states), the storage device 22 can comprise an EEPROM in one embodiment. EEPROMs provide the advantages of being inexpensive and being simple to interface with hardware. In other embodiments, flash memory, hard disks, writeable CD-ROMs, writeable digital versatile disks (DVDs), floppy disks, ZIP disks, etc. may be used.

As previously described above in the background discussion, it is sometimes impractical to constantly write information into a storage unit, as a backup in the event of a power failures. This is particularly true with EEPROMs. That is, while EEPROMs provide a suitable medium for storing and retaining information across power failures, they have limitations on the number of times they can be written to. Because an EEPROM's budget of writes should be used efficiently so as to maximize the longevity of the device, security association information or other information should be written to the EEPROM only when necessary rather than on a regular/routine basis (e.g., writes should occur only a minimum number of times, such as when a power failure is detected or when there is a change in power states).

Therefore, according to one embodiment of the invention, security association information (or other information) is selectively written into the storage unit 22 only when a power failure (or other power cycle) is detected that requires such information to be saved. In such an embodiment, once a power failure is detected, the information is written into the storage device 22 while there is still sufficient power to perform the write operation.

Figure 3:
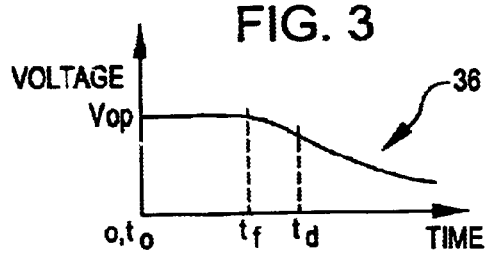
FIG. 3 is a graphical representation of voltage versus time that is used as a basis for an embodiment of the invention.

FIG. 3 is a voltage versus time graph 36 illustrating this concept. From time $t_0$ to $t_f$, a power supply provides sufficient power to the operating environment 10 (and/or to any of its individual components, such as the PC 16), such that an operating voltage $V_{OP}$ is maintained for normal operation. If a power failure occurs at $t_f$, then the graph 36 begins decaying exponentially according to a resistive-capacitive (RC) factor. As such, a write to the storage device 22 may be successfully performed if it occurs between $t_f$ and a time $t_d$ during the decay, when there is still sufficient power available. Many typical storage devices can operate at levels below specified operating voltages $V_{OP}$. According to one embodiment, the write operation may be performed when $t_d$ is a threshold value that might be any value between $0.8V_{OP}$ and $0.3V_{OP}$, for example.

Figure 4:
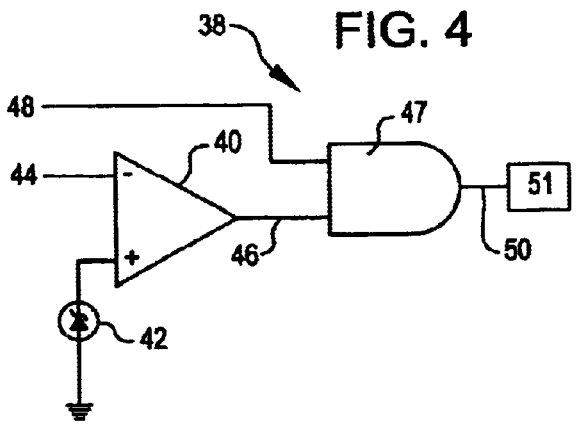
FIG. 4 is a schematic of an embodiment of a power-loss detection circuit that can be used in the embodiment shown in FIG. 2.

FIG. 4 shows an embodiment of a power detection circuit 38 that can be used to detect when a power failure (or change in power state) has occurred and then to trigger a write of the security association information (or other information) to the storage device 22. The circuit 38 may be coupled to the PC 16, to the host PC 14, to the subsystem 34, or may be located in other suitable location(s) in the operating environment 10 such that the circuit 38 can detect power states and can effect a write of security association information (or other information) to the storage device 22.

The circuit 38 comprises a comparator 40 having a first input coupled to a zener diode 42 or to a similar device. A second input of the comparator 40 receives a signal 44 indicative of the voltage supply level (e.g., $V_{OP}$) in the operating environment 10 (or the voltage/power supply level of any of the components in the operating environment 10). According to one embodiment, the zener diode 42 is designed to have a threshold voltage of $0.9V_{OP}$, for example, such that if the signal 44 falls below this level, an output signal 46 of the comparator 40 transitions (e.g., from a binary 0 state to a binary 1 state), indicative that a power failure has occurred. Under normal operating conditions, the output signal 46 remains at the binary 0 state.

In one embodiment, the output signal 46 forms one input into an AND gate 47. A second input of the AND gate 47 can be a binary 1 signal 48 indicative that a security association valid. If there is a power failure, the first input (from the comparator 40) is a binary 1. The AND gate 47 qualifies the power failure. If the security is invalid, the second input to the AND gate 47 (e.g., the signal 48) is a binary 0, and the AND gate 47 will output a binary 0 for the signal 50. If the security is valid, the signal 48 is a binary 1, and the resulting binary 1 output signal 50 of the AND gate 47 will reflect the value of the output signal 46 of the comparator 40. The binary state of the signal 50 can be subsequently processed by the subsystem 34, the host PC 14, the PC 16, a dedicated ASIC, programmable array logic (PAL) circuit, a processor, a controller, logic circuit, etc. and/or their associated software or instructions stored in a machine-readable medium (all symbolically indicated in FIG. 6 as a unit 51), thereby resulting in a write of security association information (or other information) into the storage device 22, if the binary state of the signal 50 indicates that a power failure or change in power state has occurred.

Figure 5:
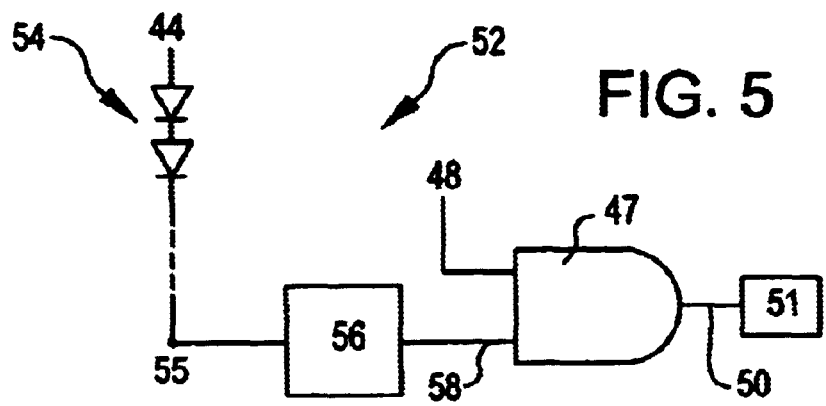
FIG. 5 is a schematic of another embodiment of a power-loss detection circuit that can be used in the embodiment shown in FIG. 2.

FIG. 5 shows another embodiment of a power detection circuit 52. The circuit 52 comprises one or more series-connected diodes 54, having the signal 44 as an input. The number and types of diodes 54 are chosen such that a voltage at a node 55 is slightly above a transition voltage for a transition circuit 56. That is, if the signal 44 is at $V_{OP}$ (e.g., under normal operating conditions), the diodes 54 step down this voltage (e.g., in increments of 0.7 volts, corresponding to the forward bias voltage of each of the diodes 54) so that the voltage at the node 55 is still above a transition voltage of the circuit 56 but not at a sufficiently lower level to trigger a change in states of the transition circuit 56.

If a power failure occurs, the decaying $V_{OP}$ voltage is stepped down even further by the diodes 54, and the voltage at the node 55 falls below the transition voltage of the circuit 56. The falling voltage at the node 55 triggers the circuit 56 to change states (e.g., output a binary 0 instead of a binary 1 as a signal 58). As with the circuit 38 of FIG. 4, the signal 58 can be a first input into the AND gate 47, and the signal 48 can be a second input. The resulting output signal 50 of the AND gate 47 can then be used by the unit 51 to trigger a write to the storage device 22.

In one embodiment, the circuit 56 can comprise a transistor-transistor logic (TTL) circuit that can change states based on a level of an input voltage. In other embodiments, ASICs, custom silicon input buffers, CMOS logic devices, buffers for peripheral component interconnect (PCI) devices, etc. can be used. For example, some types of input buffers have different voltage characteristics depending on how they are made, which are sometimes referred to as Voltage Input High (VIH) and Voltage Input Low (VIL) values. The VIH and VIL values define when an input signal is guaranteed to be sampled as high or low, and if a voltage is in between the VIH and VIL values, the result is unknown. Hence, devices having a tight window for VIH and VIL of a few hundred millivolts, for example, can be designed and used in the transition 56 such that they can detect a change in the input signal indicative of a power failure.

Figure 6:
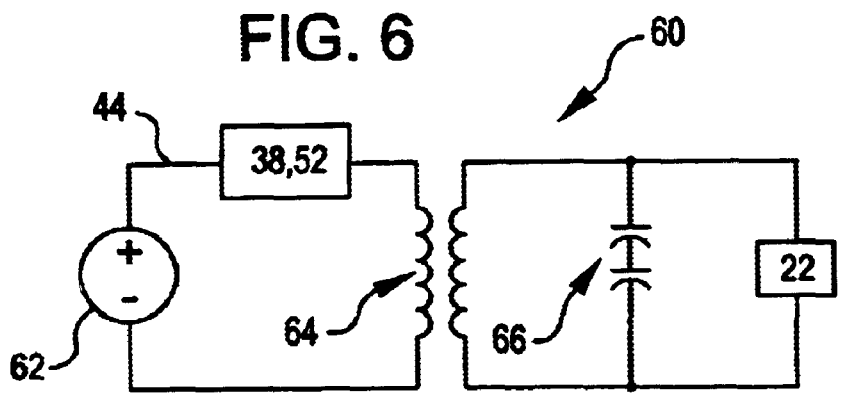
FIG. 6 is a schematic of an embodiment of an isolation power supply circuit that can be used in conjunction with the power-loss detection circuits of FIG. 4 or 5.

FIG. 6 is a schematic of an embodiment of a device 60 that can be used in conjunction with power-loss detection circuits (such as the circuits 38 and 52 shown in FIGS. 4–5) to, in effect, provide additional time to write to the storage device 22. During normal operation, a power supply 62 provides power to the components of the operating environment 10, with the power-loss detection circuits 38 or 52 monitoring the signal 44 for a power failure (or change in power states). Additionally, an isolation transformer 64 is coupled between the power supply 62 and one or more capacitors 66. During normal operation, the capacitors 66 are fully charged.

When a power failure occurs, the power-loss detection circuits 38 or 52 detect the power failure. Additionally, the voltage stored in the capacitors 66 supplement the decaying voltage $V_{OP}$, such that the voltage $V_{OP}$ decays at a lesser rate than what is shown by the graph 36 of FIG. 3. The isolation transformer 64 in effect causes the capacitors 66 to become another power source for the storage device 22, such that sufficient power is maintained for a longer period of time to write information to the storage device 22.

Figure 7:
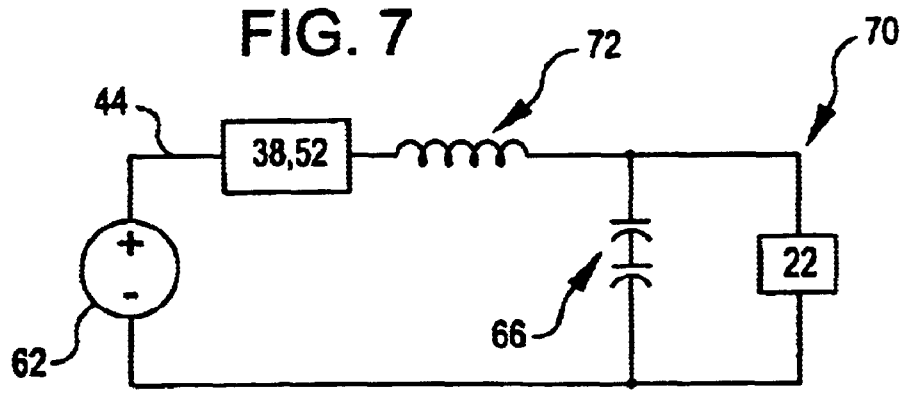
FIG. 7 is a schematic of another embodiment of an isolation power supply circuit that can be used in conjunction with the power-loss detection circuits of FIG. 4 or 5.

FIG. 7 is a schematic of another embodiment of a device 70 that can be used in conjunction with power-loss detection circuits (such as the circuits 38 and 52 shown in FIGS. 4–5) to, in effect, provide additional time to write to the storage device 22. As with the device 60 of FIG. 6, the capacitors 66 of the device 70 are fully charged during normal operation and discharge during a power outage. The device 70 includes an inductor 72 coupled between the circuits 38 (or 52) and the storage device 22. When a power outage occurs, voltages on each side of the inductor 72 will change quickly, but current would leak through the inductor 72 very slowly, thereby providing additional time to write to the storage device 22.

The following illustrative calculation can be used to illustrate the amount of time to perform writes and the amount of decay time of the voltage $V_{OP}$ that are involved with an embodiment described herein. First, a typical authentication algorithm involves 64-bit keys, although stronger algorithms may use 128-bit keys. These keys are examples of a type of security association information that can be saved in the storage device 22. A common EEPROM device has a serial interface, a 16-bit data interface, and a write time latency of 10 milliseconds. Common power supplies have a fall time of several hundred milliseconds after power is terminated. Given these factors, the following illustrative calculation may be performed for a 128-bit key (8×16 bits):

(Time required to perform write)<(Power supply fall time)/2
(Number of accesses to EEPROM)×(Write time)<(Power supply fall time)/2 (8 16-bit accesses)×(10 milliseconds)<(200 milliseconds)/2 (80 milliseconds)<(100 milliseconds)

Hence, there is a sufficient amount of time to perform the write operation. The above calculation is a conservative calculation in that the calculation is performed for a 128-bit key and that 200 milliseconds are chosen for the power supply fall time. The time to perform a write for a 64-bit key will be less, and power supplies may have longer fall times. Further, the calculation is premised that the information can be written in half the time it takes for the power supply to fall, which is an acceptable premise given that logic devices and other devices can run on lower voltages than specified. In short, embodiments of the invention can perform the writes to the storage device 22 during time periods when sufficient power remains.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. For instance, although FIGS. 4 and 5 show two embodiments of power-loss detection circuits, it is understood that other types of power-loss detection circuits may be used to detect a change in power/voltage level and to effect a write of information to a storage device using the remaining amount of power. Additionally, although the embodiments shown in FIGS. 4 and 5 use the AND gate 47, it is to be appreciated that the AND gate 47 is not required in other embodiments. That is, the unit 51 can directly process the output signal 46 of the comparator 40 or the output signal 50 of the circuit 56, without having to compare these output signals with the signal 48.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
    a power-loss detection circuit to receive an input signal indicative of a voltage supply level and to output a first output signal indicative of a change in the voltage supply level;
    a logic device having the first output signal from the detection circuit as a first signal input and a signal indicative of a valid security association as a second signal input, the logic device coupled to generate a second output signal based on the first and second signal inputs and to change the state of the second output signal if a state of the first signal input changes;
    a unit to receive the second output signal from the logic device and to effectuate a storage of information to a storage device if the second output signal from the logic device indicates that a change in the voltage supply level has occurred.

2. The apparatus of claim 1 wherein the storage device comprises an electronically erasable programmable read only memory (EEPROM) device.

3. The apparatus of claim 1 wherein the information comprises security association information.

4. The apparatus of claim 1 wherein the unit comprises a processor.

5. The apparatus of claim 1 wherein the detection circuit comprises a comparator circuit having the input signal as a first input and a reference signal as a second input, the comparator circuit being capable of generating a resulting signal that changes state if the input signal falls to a level below the reference signal.

6. The apparatus of claim 1 wherein the detection circuit comprises:
    a diode connected to receive the input signal and to output a resulting signal, the resulting signal comprising the input signal having a voltage reduced by a voltage across the diode; and
    a transition circuit to receive the resulting signal, the transition signal being capable of changing states if the resulting signal falls to a level below a transition level of the transition circuit.

7. The apparatus of claim 1, further comprising an isolation power supply circuit coupled between the detection circuit and the storage device, the isolation power supply circuit including a capacitor coupled to a transformer to isolate the capacitor from the detection circuit, the capacitor being capable of storing power while the detection circuit detects that the voltage supply level is at an operational level and being capable of providing the stored power to the storage device if the detection circuit detects that the voltage supply level has fallen below the operational level.

8. The apparatus of claim 1 wherein the unit is capable of effectuating the storage of the information in the storage device while the voltage supply level is falling below a normal operating level.

9. A system, comprising:
    a processor;
    a voltage supply unit coupled to the processor;
    a power-loss detection circuit coupled to the voltage supply unit to receive an input signal indicative of a voltage supply level of the voltage supply unit and to output a first output signal indicative of a change in the voltage supply level;
    a logic device coupled to the power-loss detection circuit having the first output signal from the detection circuit as a first signal input and a signal indicative of a valid security association as a second signal input, the logic device coupled to generate a second output signal based on the first and second signal inputs and to change the state of the second output signal if a state of the first signal input changes;
    a unit to receive the second output signal from the logic device and to effectuate a storage of information sent from the processor to a storage device if the second output signal indicates that a change in the voltage supply level has occurred.

10. The system of claim 9 wherein the information comprises security association information.

11. The system of claim 9 wherein the storage device comprises an electronically erasable programmable read only memory (EEPROM) device.

12. The system of claim 9 wherein the unit is capable of effectuating the storage of the information in the storage device while the voltage supply level is falling below a normal operating level.

13. A system, comprising:

a network circuit device;

a voltage supply unit coupled to the network circuit device;

a power-loss detection circuit coupled to the voltage supply unit to receive an input signal indicative of a voltage supply level of the voltage supply unit and to output a first output signal indicative of a change in the voltage supply level;

a logic device coupled to the power-loss detection circuit having the first output signal from the detection circuit as a first signal input and a signal indicative of a valid security association as a second signal input, the logic device coupled to generate a second output signal based on the first and second signal inputs and to change the state of the second output signal if a state of the first signal input changes; and a unit to receive the second output signal from the logic device and to effectuate a storage of information, sent from the network circuit device, to a storage device if the second output signal indicates that a change in the voltage supply level has occurred.

14. The system of claim 13 wherein the network circuit device comprises an application specific integrated circuit.

15. The system of claim 13 wherein the storage device comprises an electronically erasable programmable read only memory (EEPROM) device.

16. The system of claim 13, further comprising an isolation power supply circuit coupled between the detection circuit and the storage device, the isolation power supply circuit including a capacitor coupled to an inductor to isolate the capacitor from the detection circuit, the capacitor being capable of storing power while the detection circuit detects that the voltage supply level is at an operational level and being capable of providing the stored power to the storage device if the detection circuit detects that the voltage supply level has fallen below the operational level.

* * * * *